US009628441B2

(12) United States Patent
Sun (10) Patent No.: US 9,628,441 B2
(45) Date of Patent: Apr. 18, 2017

(54) ATTACK DEFENSE METHOD AND DEVICE (71) Applicant: Huawei Technologies Co., Ltd., Shenzhen (CN)

(72) Inventor: Hong Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 38 days.

(21) Appl. No.: 14/738,159

(22) Filed: Jun. 12, 2015

(65) Prior Publication Data

US 2015/0281177 A1 Oct. 1, 2015

Related U.S. Application Data (63) Continuation of application No. PCT/CN2013/088310, filed on Dec. 2, 2013.

(30) Foreign Application Priority Data

Dec. 25, 2012 (CN) .......................... 2012 1 0572343

(51) Int. Cl.
*H04L 29/06* (2006.01)

(52) U.S. Cl.
CPC .......... *H04L 63/02* (2013.01); *H04L 63/0254* (2013.01); *H04L 63/10* (2013.01);
(Continued)

(58) Field of Classification Search
CPC .. H04L 63/02; H04L 63/0236; H04L 63/1458
See application file for complete search history.

(56) References Cited

U.S. PATENT DOCUMENTS

2003/0061510 A1* 3/2003 Hartmann ............... H04L 63/04
726/23
2004/0133798 A1* 7/2004 Swander ............. H04L 63/1458
726/14
(Continued)

FOREIGN PATENT DOCUMENTS

CN 101026510 A 8/2007
CN 101636968 A 1/2010
(Continued)

OTHER PUBLICATIONS

Foreign Communication From a Counterpart Application, Chinese Application No. 201210572343.6, Chinese Office Action dated Sep. 8, 2015, 7 pages.

(Continued)

*Primary Examiner* — David Pearson
(74) *Attorney, Agent, or Firm* — Blakely, Sokoloff, Taylor & Zafman LLP (57) ABSTRACT An attack defense method and device, which relate to the communications field and effectively defend against a Secure Socket Layer (SSL) denial of service (DoS) attack behavior. The method includes after a Transmission Control Protocol (TCP) connection to a client is established, the attack defense device receives a key negotiation request message sent by the client; when a session monitoring table of the client exists, the attack defense device determines whether a session identity exists in the session monitoring table of the client; when the session identity does not exist, the attack defense device records the session identity into the session monitoring table, and determines whether a quantity of session identities of the client is greater than a first preset value; and when the quantity of session identities of the client is greater than the first preset value, disconnects the TCP connection.

19 Claims, 6 Drawing Sheets (52) U.S. Cl.
CPC .......... *H04L 63/1458* (2013.01); *H04L 69/16* (2013.01); *H04L 63/045* (2013.01); *H04L 63/06* (2013.01); *H04L 63/166* (2013.01)

(56) References Cited

U.S. PATENT DOCUMENTS

| | | |
|---|---|---|
| 2010/0088763 A1 | 4/2010 | Yoo |
| 2011/0055921 A1 | 3/2011 | Narayanaswamy et al. |
| 2012/0185585 A1 | 7/2012 | Bhate |

FOREIGN PATENT DOCUMENTS

| | | |
|---|---|---|
| CN | 101656634 A | 2/2010 |
| CN | 102014116 A | 4/2011 |
| CN | 103051633 A | 4/2013 |

OTHER PUBLICATIONS

Dierks, et al., "The TLS Protocol," Version 1.0, RCE 2246, Jan. 1999, 72 pages.
Partial English Translation and Abstract of Chinese Patent Application No. CN101026510A, May 28, 2015, 6 pages.
Partial English Translation and Abstract of Chinese Patent Application No. CN103051633A, May 28, 2015, 2 pages.
Foreign Communication From a Counterpart Application, PCT Application No. PCT/CN2013/088310, International Search Report dated Jan. 30, 2014, 2 pages.
Foreign Communication From a Counterpart Application, PCT Application No. PCT/CN2013/088310, Written Opinion dated Jan. 30, 2014, 8 pages.

\* cited by examiner

FIG. 1

```
┌─────────────────────────────────────────────────────┐
│ After a Transmission Control Protocol TCP           │
│ connection to a client is established, receive a    │─── S201
│ key negotiation request message sent by the client, │
│ where the key negotiation request message includes  │
│ a source IP address, a user name, and a session     │
│ identity of the client                              │
└─────────────────────────────────────────────────────┘
                         ▼
┌─────────────────────────────────────────────────────┐
│ Determine, according to the source IP address and   │
│ the user name of the client, whether a session      │
│ monitoring table of the client exists, where the    │─── S202
│ session monitoring table is used to record a source │
│ IP address, a user name, and session identity       │
│ information of a client that has performed key      │
│ negotiation                                         │
└─────────────────────────────────────────────────────┘
                         ▼
┌─────────────────────────────────────────────────────┐
│ If the session monitoring table of the client       │
│ exists, determine whether the session identity      │─── S203
│ exists in the session monitoring table of the       │
│ client                                              │
└─────────────────────────────────────────────────────┘
                         ▼
┌─────────────────────────────────────────────────────┐
│ Record the session identity into the session        │
│ monitoring table if the session identity does not   │─── S204
│ exist in the session monitoring table               │
└─────────────────────────────────────────────────────┘
                         ▼
┌─────────────────────────────────────────────────────┐
│ Determine whether a quantity of session identities  │─── S205
│ of the client is greater than a first preset value  │
└─────────────────────────────────────────────────────┘
                         ▼
┌─────────────────────────────────────────────────────┐
│ Disconnect the TCP connection if it is determined   │
│ that the quantity of session identities of the      │─── S206
│ client is greater than the first preset value       │
└─────────────────────────────────────────────────────┘
```

ATTACK DEFENSE METHOD AND DEVICE

CROSS-REFERENCE TO RELATED APPLICATIONS

This application is a continuation of International Application No. PCT/CN2013/088310, filed on Dec. 2, 2013, which claims priority to Chinese Patent Application No. 201210572343.6, filed on Dec. 25, 2012, both of which are hereby incorporated by reference in their entireties.

TECHNICAL FIELD

The present invention relates to the communications field, and in particular, to an attack defense method and device.

BACKGROUND

In recent years, there are increasing denial of service (DoS) attacks on the Secure Socket Layer (SSL). In the SSL protocol, the SSL handshake protocol requires an extremely large computation amount for a server; and the server needs to perform a private key decryption operation, and generally a computation complexity of performing a private key decryption operation by the server may be exponentially more than a computation complexity of a client. Therefore, an SSL DoS attack uses this characteristic of the SSL protocol: an ordinary computer is connected to a digital subscriber line (DSL), and an encryption key is frequently requested by the ordinary computer within a short time to consume central processing unit (CPU) resources of an SSL server, so as to initiate attacks on the SSL server.

The client may continuously initiate a key negotiation request ClientHello message to the server, where the ClientHello message initiated by the client to the server includes a session identity (SessionID), and the SessionID may be reused. When the SessionID in the ClientHello message sent by the client exists in a local SessionID list of the server, the server sends a key negotiation response ServerHello message including the SessionID to the client. When the SessionID sent by the client does not exist in the SessionID list of the server, the server randomly generates a new SessionID and sends the SessionID to the client. In this way, the client and the server continue to complete an SSL key negotiation process. In this case, when the client continuously initiates a ClientHello message to the server and continuously performs SSL key negotiation with the server, it is extremely easy for the server to use up resources, thereby causing that a normal service on the server cannot be accessed. Currently, there is no effective method that can defend against an SSL DoS attack behavior.

SUMMARY

Embodiments of the present invention provide an attack defense method and device, which can effectively defend against an SSL DoS attack behavior.

To achieve the foregoing objective, the following technical solutions are adopted in the embodiments of the present invention:

According to a first aspect, an embodiment of the present invention provides an attack defense method, including after a Transmission Control Protocol (TCP) connection to a client is established, receiving a key negotiation request message sent by the client, where the key negotiation request message includes a source internet protocol (IP) address, a user name, and a session identity of the client; determining, according to the source IP address and the user name of the client, whether a session monitoring table of the client exists, where the session monitoring table is used to record a source IP address, a user name, and session identity information of a client that has performed key negotiation; if the session monitoring table of the client exists, determining whether the session identity exists in the session monitoring table of the client; recording the session identity into the session monitoring table if the session identity does not exist in the session monitoring table; determining whether a quantity of session identities of the client is greater than a first preset value; and disconnecting the TCP connection if the quantity of session identities of the client is greater than the first preset value.

With reference to the first aspect, in a first possible implementation manner, the method further includes acquiring an increment in the quantity of session identities of the client within a unit time; determining whether the increment in the quantity of session identities of the client within the unit time is greater than a second preset value; and disconnecting the TCP connection if the increment in the quantity of session identities of the client within the unit time is greater than the second preset value.

With reference to the first aspect or the first possible implementation manner of the first aspect, in a second possible implementation manner, the method further includes if the session monitoring table of the client does not exist, creating the session monitoring table according to the source IP address, the user name, and the session identity of the client, and recording the session identity into the session monitoring table.

With reference to the first aspect or the first possible implementation manner of the first aspect or the second possible implementation manner of the first aspect, in a third possible implementation manner, the method further includes if the session identity exists in the session monitoring table or the quantity of session identities of the client is not greater than the first preset value, sending a key negotiation response message including the session identity to the client.

With reference to the first aspect or the first possible implementation manner of the first aspect or the second possible implementation manner of the first aspect, in a fourth possible implementation manner, after the disconnecting the TCP connection, the method further includes deleting the session identity information from the session monitoring table.

With reference to the first possible implementation manner of the first aspect, in a fifth possible implementation manner, the method further includes adding the client to a blacklist if the increment in the quantity of session identities of the client within the unit time is greater than the second preset value.

According to a second aspect, an attack defense device is provided, including a receiving unit configured to, after a TCP connection to a client is established, receive a key negotiation request message sent by the client, where the key negotiation request message includes a source IP address, a user name, and a session identity of the client; a determining unit configured to determine, according to the source IP address and the user name of the client, whether a session monitoring table of the client exists, where the session monitoring table is used to record a source IP address, a user name, and session identity information of a client that has performed key negotiation; and the determining unit is further configured to, when the session monitoring table of the client exists, determine whether the session identity exists in the session monitoring table of the client; a recording unit configured to record the session identity into the session monitoring table when the determining unit determines that the session identity does not exist in the session monitoring table, where the determining unit is further configured to determine whether a quantity of session identities of the client is greater than a first preset value; and a processing unit configured to disconnect the TCP connection when the determining unit determines that the quantity of session identities of the client is greater than the first preset value.

With reference to the second aspect, in a first possible implementation manner, the device further includes an increment acquiring unit configured to acquire an increment in the quantity of session identities of the client within a unit time, where the determining unit is further configured to determine whether the increment, acquired by the increment acquiring unit, in the quantity of session identities of the client within the unit time is greater than a second preset value; and the processing unit is further configured to disconnect the TCP connection when the determining unit determines that the increment in the quantity of session identities of the client within the unit time is greater than the second preset value.

With reference to the second aspect or the first possible implementation manner of the second aspect, in a second possible implementation manner, the device further includes a monitoring table management unit configured to, when the determining unit determines that the session monitoring table of the client does not exist, create the session monitoring table of the client according to the source IP address, the user name, and the session identity of the client, and record the session identity into the session monitoring table.

With reference to the second aspect or the first possible implementation manner of the second aspect or the second possible implementation manner of the second aspect, in a third possible implementation manner, the device further includes a sending unit configured to, when the determining unit determines that the session identity exists in the session monitoring table or the quantity of session identities of the client is not greater than the first preset value, send a key negotiation response message including the session identity to the client.

With reference to the second possible implementation manner of the second aspect, in a fourth possible implementation manner, the monitoring table management unit is further configured to delete the session identity information from the session monitoring table after the processing unit disconnects the TCP connection; and the processing unit is further configured to add the client to a blacklist if the increment in the quantity of session identities of the client within the unit time is greater than the second preset value.

According to an attack defense method and device provided in the embodiments of the present invention, after a TCP connection to a client is established, a key negotiation request message sent by the client is received, where the key negotiation request message includes a source IP address, a user name, and a session identity of the client; it is determined, according to the source IP address and the user name of the client, whether a session monitoring table of the client exists; if the session monitoring table of the client exists, it is determined whether the session identity exists in the session monitoring table of the client; if the session identity does not exist in the session monitoring table, the session identity is recorded into the session monitoring table, and it is determined whether a quantity of session identities of the client is greater than a first preset value; and if the quantity of session identities of the client is greater than the first preset value, the TCP connection is disconnected. In this way, an SSL DoS attack behavior can be effectively defended against.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
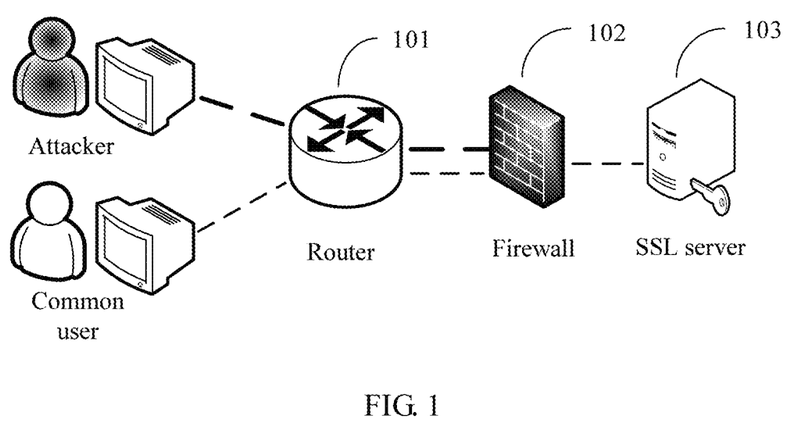
FIG. 1 is a schematic diagram of an application network architecture of an attack defense method according to an embodiment of the present invention.

An attack defense method provided in the embodiments of the present invention may be implemented in a gateway product such as a router 101 or a firewall 102, and may be applied to a distributed denial of service (DDoS) cleaning device, where the gateway product such as the router 101 or the firewall 102, or the DDoS cleaning device is deployed on the front end of a Secure Socket Layer (SSL) server 103, so that an attack initiated by an attacker to the SSL server 103 can be prevented, thereby implementing protection for the SSL server 103. In addition, the attack defense method provided in the embodiments of the present invention may further be deployed on the SSL server 103 in a form of software, so as to detect an SSL request, thereby preventing an SSL denial of service (DoS) attack behavior. FIG. 1 is a schematic diagram of an application network architecture of an attack defense method according to an embodiment of the present invention. As shown in FIG. 1, same as a common user, an attacker may use an ordinary computer to interact with the SSL server 103. After establishing a Transmission Control Protocol (TCP) connection to the SSL server 103, the attacker continuously and quickly repeats key negotiation in the established TCP connection, so as to attack the SSL server 103. The attacker may attack the SSL server 103 by using one established TCP connection to the SSL server 103, and may also attack the SSL server 103 by using multiple established TCP connections to the SSL server 103. Certainly, more TCP connections indicate greater damage to the SSL server. In addition, there may be multiple attackers.

Figure 2:
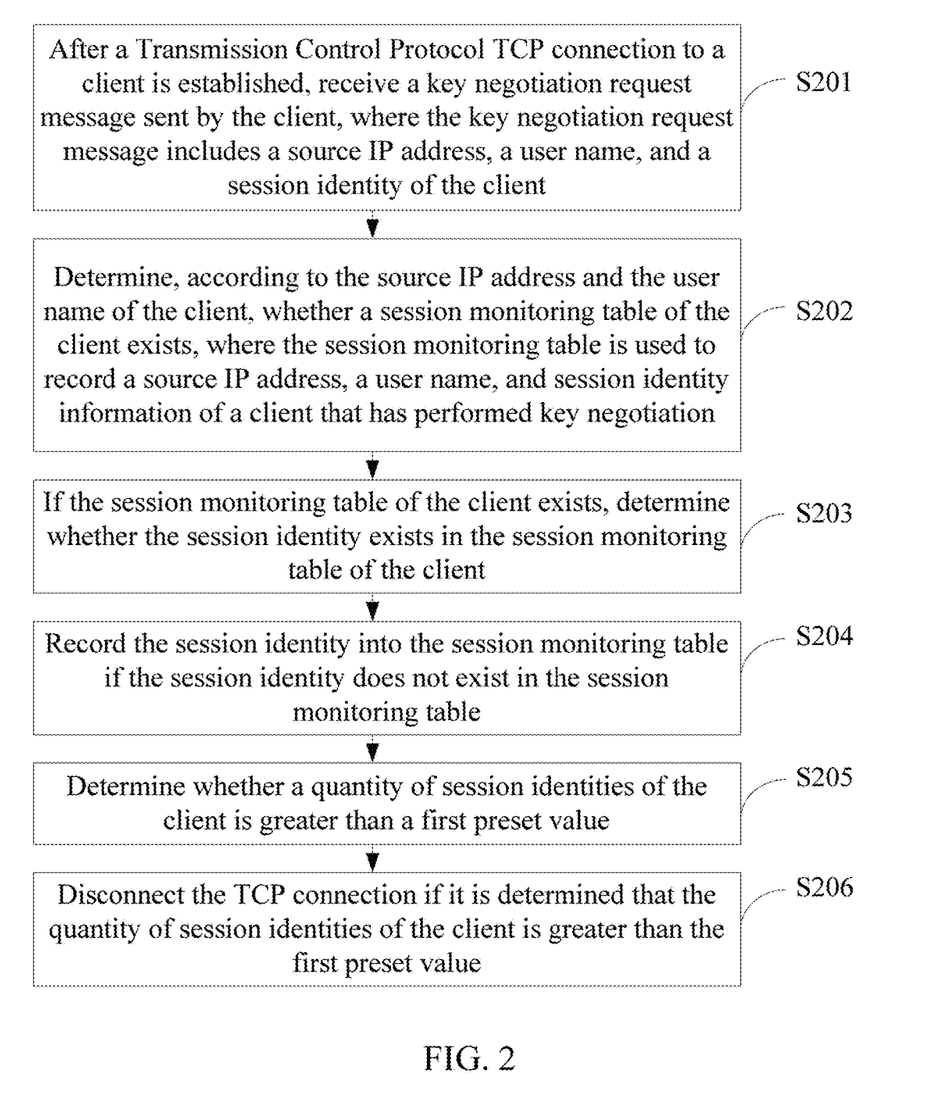
FIG. 2 is a schematic flowchart of an attack defense method according to an embodiment of the present invention.

An embodiment of the present invention provides an attack defense method. As shown in FIG. 2, the attack defense method may be used to defend against a SSL DoS attack. The method includes:

S201. After a TCP connection to a client is established, receive a key negotiation request message sent by the client, where the key negotiation request message includes a source IP address, a user name, and a session identity of the client.

Exemplarily, the method is executed by an SSL server in the following description. After establishing a TCP connection to the client, the server and the client start to enter a key negotiation process of the SSL protocol, that is, start to enter a handshake process with the client. During this period, the client needs to perform a public key encryption operation, and the server needs to perform a private key decryption operation, so as to provide security and data integrity for network communication.

S202. Determine, according to the source IP address and the user name of the client, whether a session monitoring table of the client exists, where the session monitoring table is used to record a source IP address, a user name, and session identity information of a client that has performed key negotiation.

S203. If the session monitoring table of the client exists, determine whether the session identity exists in the session monitoring table of the client.

S204. Record the session identity into the session monitoring table if the session identity does not exist in the session monitoring table.

S205. Determine whether a quantity of session identities of the client is greater than a first preset value.

S206. Disconnect the TCP connection if it is determined that the quantity of session identities of the client is greater than the first preset value.

According to an attack defense method provided in this embodiment of the present invention, after a TCP connection to a client is established, a key negotiation request message sent by the client is received, where the key negotiation request message includes a source IP address, a user name, and a session identity of the client; it is determined, according to the source IP address and the user name of the client, whether a session monitoring table of the client exists; if the session monitoring table of the client exists, it is determined whether the session identity exists in the session monitoring table of the client; if the session identity does not exist in the session monitoring table, the session identity is recorded into the session monitoring table, and it is determined whether the quantity of session identities of the client in the session monitoring table of the client is greater than a first preset value; and if the quantity of session identities of the client is greater than the first preset value, the TCP connection is disconnected. In this way, an SSL DoS attack behavior can be effectively defended against.

Figure 3A:
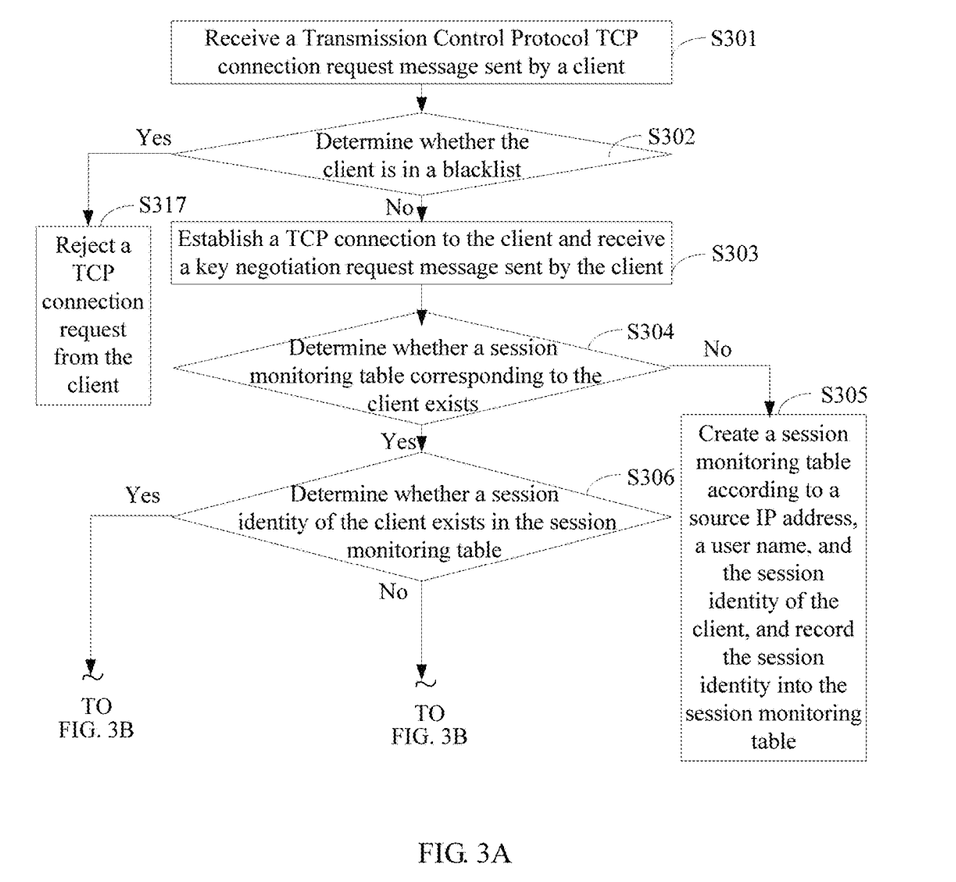
FIG. 3A and FIG. 3B are a schematic flowchart of an attack defense method according to an embodiment of the present invention.
Figure 3B:
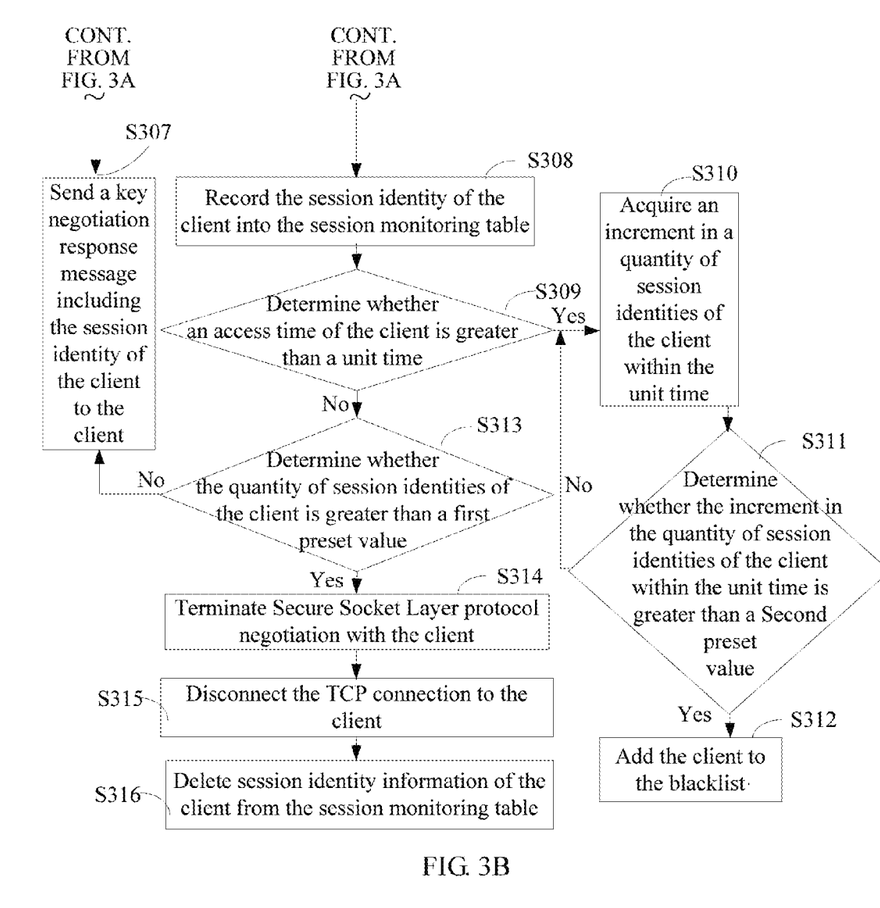

An embodiment of the present invention provides another attack defense method. The method is executed by an SSL server in the following description, and as shown in FIG. 3A and FIG. 3B, the method includes:

S301. Receive a TCP connection request message sent by a client, and go to step S302.

S302. Determine whether the client is in a blacklist; if the client is in the blacklist, go to step S317; and if the client is not in the blacklist, go to step S303.

Information about a suspicious attacker is recorded in the blacklist, where the information includes information such as a source IP address and a user name of the suspicious client attacker and is used to prevent the server from establishing a TCP connection to a client in the blacklist. Specifically, when a client initiates a large number of connections to the server to cause an attack, the server can add the client to the blacklist. If a client in the blacklist initiates a connection request to the server again, the server can directly prevent the client from performing a TCP connection; if a client is not in the blacklist, the server allows the client to establish a TCP connection and perform normal communication. It may be understood that specified aging time may be set for a client in the blacklist; and the client can perform a TCP connection again to the server only when the aging time expires.

S303. Establish a TCP connection to the client and receive a key negotiation request message sent by the client, where the key negotiation request message includes a source IP address, a user name, and a session identity (SessionID) of the client; and go to step S304.

Exemplarily, after the server establishes a TCP connection to the client, the two communication parties can transmit data at the same time and enter an SSL negotiation process of the server and the client, so as to ensure data transmission security of a network; and a data encryption (Encryption) technology may be used to ensure that data is not intercepted or listened to in a transmission process on the network.

During the SSL negotiation, the client sends a key negotiation request message (ClientHello message) to the server, where the key negotiation request message may include version information, a random number, a SessionID, and an encryption algorithm. When compression is required for communication data between the client and the server, the key negotiation request message may further include a compression algorithm.

The SSL protocol is located between the TCP protocol and various application layer protocols (for example, the hypertext transfer protocol (HTTP) protocol); provides security support for data communication and also provides support of basic functions such as data encapsulation, compression, and encryption for a high-layer protocol; and also is used, before actual data transmission, by two communication parties to perform identity authentication, negotiate an encryption algorithm, exchange an encryption key, and the like.

S304. Determine whether a session monitoring table corresponding to the client exists, where the session monitoring table is used to record a source IP address, a user name, and session identity information of a client that has performed key negotiation. If the session monitoring table corresponding to the client does not exist, go to step S305; and if the session monitoring table corresponding to the client exists, go to step S306.

S305. Create a session monitoring table according to the source IP address, the user name, and the session identity of the client, and record the session identity into the session monitoring table.

Exemplarily, after the server receives the key negotiation request message from the client, the server determines, according to the key negotiation request message, whether a session monitoring table corresponding to the client exists. When the server determines that the session monitoring table corresponding to the client does not exist, that is, the client initiates a connection to the server for the first time, the server creates a session monitoring table for the client according to the key negotiation request message sent by the client, records the session identity of the client into the session monitoring table, may set a quantity of session identities of the client to 1, and then sends a key negotiation response message including the session identity to the client.

The session monitoring table may include the source IP address, the user name, and the session identity of the client. The user name herein may also be a machine name and may be used to distinguish an independent access source. For example, in a network address translation (NAT) network environment, access of multiple clients is difficult to be distinguished only by using the source IP of the client.

In this way, when the client initiates the connection to the server for the first time, the server adds the session identity of the client to a key negotiation response message (Server-Hello message) and sends the message to the client, so as to complete the SSL negotiation process with the client. The key negotiation response message sent by the server to the client may include version information, a random number, a sessionID, and an encryption algorithm; and when communication data needs to be compressed, the message may also include a compression algorithm. Therefore, when the key negotiation response message also includes a compression algorithm, the client and the server send a key negotiation message to each other, so that negotiations about SSL version information, the random number, the sessionID, the encryption algorithm, and the compression algorithm can be completed.

S306. Determine whether the session identity of the client exists in the session monitoring table; if the session identity of the client exists in the session monitoring table, go to step S307; and if the session identity of the client does not exist in the session monitoring table, go to step S308.

S307. Send a key negotiation response message including the session identity of the client to the client.

Exemplarily, after the server receives the key negotiation request message from the client, the server determines that the session monitoring table corresponding to the client exists, and then determines whether the session identity of the client exists in the session monitoring table. It is assumed that the session identity of the client is Session 1, and if the server determines that Session 1 exists in the session monitoring table, Session 1 is valid and reusable. Therefore, Session 1 is added to the key negotiation response message, and then a key negotiation response message including Session 1 is sent to the client, so as to complete a subsequent process of the SSL negotiation.

S308. Record the session identity of the client into the session monitoring table, and go to step S309.

Exemplarily, after the server receives the key negotiation request message from the client, the server determines that the session monitoring table corresponding to the client exists, and then determines whether the session identity of the client exists in the session monitoring table. It is assumed that the session identity of the client is Session 1, and when Session 1 does not exist in the session monitoring table, the server records Session 1 into the session monitoring table, and increases the quantity of session identities of the client by one or accumulates the quantity of session identities by a fixed value. The quantity of session identities is a quantity of SSL connections established by the client and the server.

S309. Determine whether an access time of the client is longer than a unit time; if the access time of the client is longer than the unit time, go to step S310; and if the access time of the client is not longer than the unit time, go to step S313.

Each unit time is a detection period. Setting the unit time is used to detect the quantity of SSL connections established by the client and the server in a period of time. A length of the unit time may be set according to an actual situation and is not limited herein.

S310. Acquire an increment in a quantity of session identities of the client within the unit time, and go to step S311.

Exemplarily, the number CountNum1 of session identities of the client may be first acquired at a starting moment of a unit time, then the number CountNum2 of session identities of the client is acquired at an ending moment of the unit time, and an increment in the quantity of session identities of the client within the unit time can be obtained by means of CountNum2−CountNum1.

S311. Determine whether the increment in the quantity of session identities of the client within the unit time is greater than a second preset value; if the increment is greater than the second preset value, go to step S312; and if the increment is not greater than the second preset value, restart a timer and return to step S310.

If within the unit time, a quantity of connections initiated by the client to the server is not greater than the second preset value, the server restarts the timer, returns to S310, and starts to acquire the quantity of connections initiated by the client to the server in a next unit time, that is, the increment in the quantity of session identities of the client.

S312. Add the client to the blacklist.

Exemplarily, when the client accesses the server, the client can use an advantage that a computation amount of negotiation by the server is far higher than a computation amount of the client itself and that the client can actively initiate an SSL renegotiation, so as to make a DoS attack. For this case, when the quantity of connections that are initiated by the client to the server within the unit time, that is, the increment in the quantity of session identities of the client within the unit time in the session monitoring table, is greater than the second preset value, the server adds the client to the blacklist and terminates a communication negotiation process with the client. As such, if the unit time is set to be relatively short, a large number of DoS attacks launched within a short time can be defended against. Information about a suspicious attacker is recorded in the blacklist, where the information includes information such as a source IP address and a user name of the suspicious client attacker and is used to prevent the server from establishing a TCP connection to a client in the blacklist.

Exemplarily, it is assumed that the unit time is 1 second and the second preset value is 10, that is, a maximum quantity of connections that can be supported by the server in 1 second is 10. If the quantity of connections that are initiated by the client to the server in this 1 second is greater than 10, that is, the increment in the quantity of session identities of the client in 1 second in the session monitoring table is greater than 10, the server adds the client to the blacklist, and sends an error message to the client to terminate an SSL protocol negotiation with the client, so as to prevent the client from making a DoS attack.

Aging may be performed on the blacklist of the server according to a period. Only after the blacklist ages, a client added to the blacklist can establish a TCP connection and an SSL connection to the server again. In this way, the server can defend against an instantaneous attack due to a large number of connections that are initiated by the client to the server within a short time.

S313. Determine whether the quantity of session identities of the client is greater than a first preset value; if the quantity of session identities of the client is greater than the first preset value, go to step S314; and if the quantity of session identities of the client is not greater than the first preset value, go to step S307.

Exemplarily, the first preset value may be the maximum number, set by the server, of SSL connections that each client can establish to the server. After increasing the quantity of session identities of the client by one or accumulating the quantity of session identities of the client by a fixed value, the server determines whether the quantity of session identities that is increased by one or accumulated by the fixed value is greater than a first preset value. When the quantity of session identities that is increased by one or accumulated by the fixed value is not greater than the first preset value the server adds the session identity to the key negotiation response message and then sends the key negotiation response message to the client, helping the server and the client to continue to complete the subsequent process of the SSL negotiation. The subsequent process, for example, may be as follows: If the server and the client exchange keys by using certificates, the server needs to provide a digital certificate of itself and sends the digital certificate to the client in a Certificate message, where the server sends ServerHelloDone (a key negotiation completion message) so as to represent completion of a handshake stage. Optionally, the server and the client may also not exchange keys by using certificates but exchange the keys by using the Hellman-Deffie (encryption) algorithm. In this case, the server needs to provide other key information to continue an SSL key negotiation process with the client.

S314. Terminate Secure Socket Layer protocol negotiation with the client and go to step S315.

An error message may be sent to the client to terminate the Secure Socket Layer protocol negotiation with the client.

S315. Disconnect the TCP connection to the client and go to step S316.

S316. Delete session identity information of the client from the session monitoring table.

Information in the session monitoring table includes information such as the session identity and a session pointer of the client. After disconnecting the TCP connection to the client, the server deletes current session identity information of the client. In addition, when a session of the client ages or when the client or the server terminates communication, the current session identity information of the client may also be deleted from the session monitoring table of the client.

In conclusion, if the quantity of connections that are initiated by the client to the server in a period of time, that is, the quantity of session identities, is greater than the first preset value, the server sends an error message to the client to terminate the SSL negotiation with the client; or, if the increment in the quantity of connections that are initiated by the client to the server within the unit time, that is, the increment in the quantity of session identities, is greater than the second preset value, the server adds the client to the blacklist, then sends an error message to the client to terminate the SSL negotiation with the client, disconnects the TCP connection to the client, and deletes the session identity information of the client from the session monitoring table. In this way, the server can control the quantity of SSL negotiations established with the client in a proper range, thereby effectively defending against an SSL DoS attack behavior.

It should be noted that S309 to S312 may be implemented by a device to determine whether the quantity of session identities of the client within the unit time is greater than the second preset value, and S313 to S316 may be implemented by the device to determine whether the quantity of session identities of the client is greater than the first preset value. S309 to S312 and S313 to S316 may be two concurrent implementation methods, that is, S309 to S312 or S313 to S316 may be performed independently. S309 to S312 and S313 to S316 may also be two mutually supplementary implementation methods, and both S309 to S312 and S313 to S316 are performed. A performing sequence of the two implementation methods is not limited, and in an actual situation, the methods may be performed according to a status of a connection initiated by the client.

S317 as shown in FIG. 3A. Reject a TCP connection request from the client.

When it is determined that the client that initiates the TCP connection request in step S302 is in the blacklist, because an IP address and a user name of an attack host are recorded in the blacklist, a reset request (RST) message may be sent to the client to reject the TCP connection request initiated by the client, so as to reject establishing a TCP connection to the client. Certainly, it may be understood that the TCP connection request of the client may also be rejected in a manner of discarding a TCP connection request message sent by the client.

According to an attack defense method provided in this embodiment of the present invention, after a TCP connection to a client is established, a key negotiation request message sent by the client is received; it is determined, according to a source IP address and a user name of the client, whether a session monitoring table of the client exists; if the session monitoring table of the client exists, it is determined whether a session identity exists in the session monitoring table of the client; if the session identity does not exist in the session monitoring table, the session identity is recorded into the session monitoring table; it is determined whether a quantity of session identities of the client is greater than a first preset value; if the quantity of session identities of the client is greater than the first preset value, the TCP connection is disconnected or an increment in the quantity of session identities of the client within a unit time is acquired; it is determined whether the increment in the quantity of session identities of the client within the unit time is greater than a second preset value; if the increment in the quantity of session identities of the client within the unit time is greater than the second preset value, the TCP connection is disconnected. In this way, the client can be prevented from making an instantaneous attack by initiating a large number of connections within a short time, thereby effectively defending against an SSL DoS attack behavior.

Figure 4:
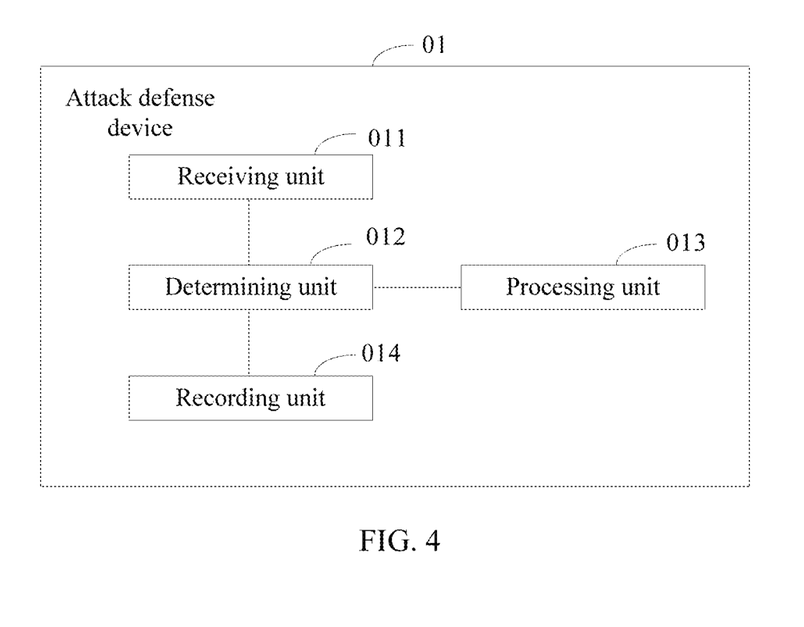
FIG. 4 is a schematic structural diagram of an attack defense device according to an embodiment of the present invention.

An embodiment of the present invention further provides an attack defense device 01. The device may be a gateway device such as a router, a firewall, or a DDoS cleaning device, and may also be an SSL server. As shown in FIG. 4, the attack defense device includes a receiving unit 011 configured to, after a TCP connection to a client is established, receive a key negotiation request message sent by the client, where the key negotiation request message includes a source IP address, a user name, and a session identity of the client; a determining unit 012 configured to determine, according to the source IP address and the user name of the client, whether a session monitoring table of the client exists, where the session monitoring table is used to record a source IP address, a user name, and session identity information of a client that has performed key negotiation; and the determining unit 012 is further configured to, when the session monitoring table of the client exists, determine whether the session identity exists in the session monitoring table of the client; a recording unit 013 configured to record the session identity into the session monitoring table when the determining unit 012 determines that the session identity does not exist in the session monitoring table, where the determining unit 012 is further configured to determine whether a quantity of session identities of the client is greater than a first preset value; and a processing unit 014 configured to disconnect the TCP connection when the determining unit 012 determines that the quantity of session identities of the client is greater than the first preset value.

According to an attack defense device provided in this embodiment of the present invention, after a TCP connection to a client is established, a key negotiation request message sent by the client is received; it is determined, according to a source IP address and a user name of the client, whether a session monitoring table of the client exists; if the session monitoring table of the client exists, it is determined whether a session identity exists in the session monitoring table of the client; if the session identity does not exist in the session monitoring table, the session identity is recorded into the session monitoring table, and it is determined whether the quantity of session identities of the client is greater than a first preset value; and if the quantity of session identities of the client is greater than the first preset value, the TCP connection is disconnected. In this way, an SSL DoS attack behavior can be effectively defended against.

Figure 5:
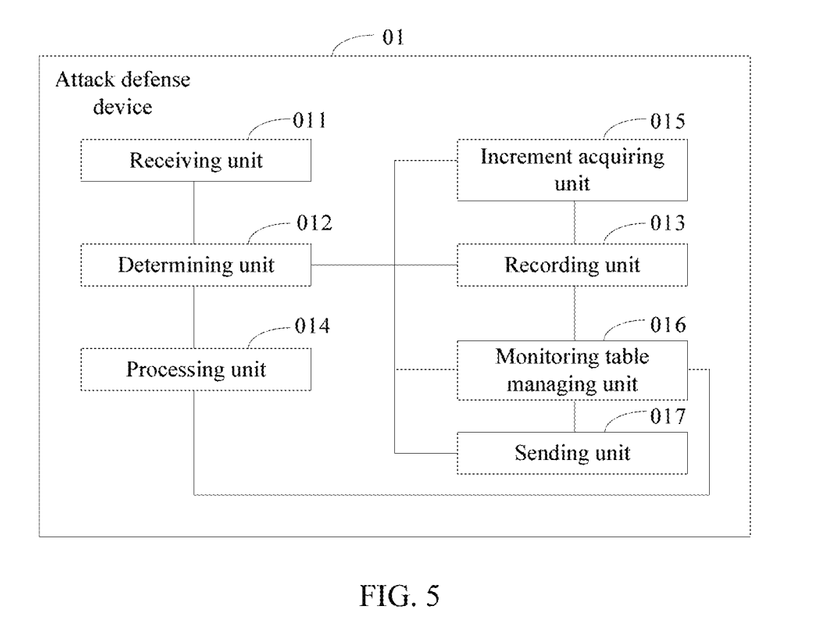
FIG. 5 is a schematic structural diagram of another attack defense device according to an embodiment of the present invention.

Further, as shown in FIG. 5, based on the embodiment shown in FIG. 4, the attack defense device 01 may further include an increment acquiring unit 015 configured to acquire an increment in the quantity of session identities of the client within a unit time, where the determining unit 012 is further configured to determine whether the increment, acquired by the increment acquiring unit 015, in the quantity of session identities of the client within the unit time is greater than a second preset value; and the processing unit 014 is further configured to disconnect the TCP connection when the determining unit 012 determines that the increment in the quantity of session identities of the client within the unit time is greater than the second preset value.

Further, the attack defense device 01 may further include a monitoring table management unit 016 configured to, when the determining unit 012 determines that the session monitoring table of the client does not exist, create the session monitoring table of the client according to the source IP address, the user name, and the session identity of the client, and record the session identity into the session monitoring table.

Further, the device may further include a sending unit 017 configured to, when the determining unit 012 determines that the session identity exists in the session monitoring table or the quantity of session identities of the client is not greater than the first preset value, send a key negotiation response message including the session identity to the client.

Further, the monitoring table management unit 016 may further be configured to delete the session identity information from the session monitoring table after the processing unit disconnects the TCP connection.

Further, the processing unit 014 may further be configured to add the client to a blacklist if the increment in the quantity of session identities of the client within the unit time is greater than the second preset value.

Based on the foregoing embodiment, an attack defense device shown in this embodiment of the present invention may further determine, by acquiring an increment in a quantity of session identities of a client within a unit time, whether the increment in the quantity of session identities of the client within the unit time is greater than a second preset value; and disconnect a TCP connection if the increment in the quantity of session identities of the client within the unit time is greater than the second preset value. In this way, the client can be prevented from performing an instantaneous attack by initiating a large number of connections within a short time, so that a function of defending against an SSL DoS attack behavior is further enhanced.

Figure 6:
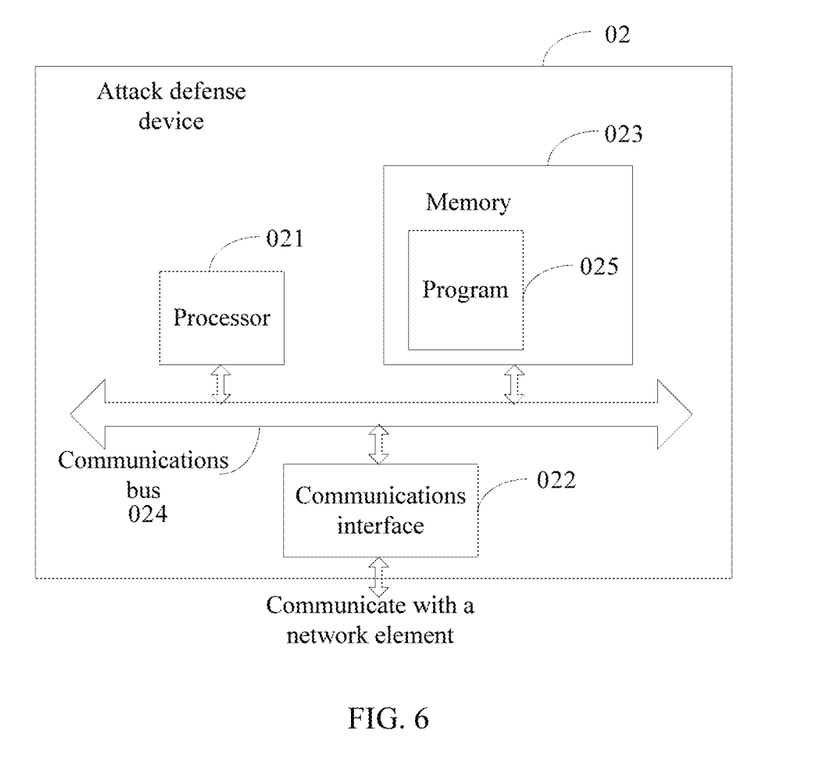
FIG. 6 is a schematic structural diagram of yet another attack defense device according to an embodiment of the present invention.

FIG. 6 is another attack defense device 02 provided in an embodiment of the present invention. The device may be a router, a firewall, or a DDOS cleaning device, and may also be a host server that has an attack defense capability. A specific embodiment of the present invention sets no limitation on specific implementation of the device. As shown in FIG. 6, the attack defense device 02 may include a processor 021, a communications interface 022, a memory 023, and a communications bus 024.

The processor 021, the communications interface 022, and the memory 023 complete mutual communication by using the communications bus 024.

The communications interface 022 is configured to communicate with a network element, such as a client or an SSL server.

The processor 021 is configured to execute a program 025, and may perform related steps in the method embodiment shown in FIG. 2 or FIG. 3A and FIG. 3B.

The program 025 may include program code, where the program code includes a computer operation instruction.

The processor 021 may be a central processing unit (CPU), or an application specific integrated circuit (ASIC), or one or more integrated circuits configured to implement this embodiment of the present invention.

The memory 023 is configured to store the program 025. The memory 023 may include a high-speed random-access memory (RAM) memory, and may also include a non-volatile memory, such as at least one disk memory. The program 025 may include a receiving unit 011 configured to, after a TCP connection to a client is established, receive a key negotiation request message sent by the client, where the key negotiation request message includes a source IP address, a user name, and a session identity of the client; a determining unit 012 configured to determine, according to the source IP address and the user name of the client, whether a session monitoring table of the client exists, where the session monitoring table is used to record a source IP address, a user name, and session identity information of a client that has performed key negotiation; and the determining unit 012 is further configured to, when the session monitoring table of the client exists, determine whether the session identity exists in the session monitoring table of the client; a recording unit 013 configured to record the session identity into the session monitoring table when the determining unit 012 determines that the session identity does not exist in the session monitoring table, where the determining unit 012 is further configured to determine whether a quantity of session identities of the client is greater than a first preset value; and a processing unit 014 configured to disconnect the TCP connection when the determining unit 012 determines that the quantity of session identities of the client is greater than the first preset value.

For specific implementation of each module in the program 025, refer to a corresponding module in the embodiment shown in FIG. 4 or FIG. 5. Details are not described herein again.

According to an attack defense device provided in this embodiment of the present invention, after a Transmission Control Protocol TCP connection to a client is established, a key negotiation request message sent by the client is received; it is determined, according to a source IP address and a user name of the client, whether a session monitoring table of the client exists; if the session monitoring table of the client exists, it is determined whether a session identity exists in the session monitoring table of the client; if the session identity does not exist in the session monitoring table, the session identity is recorded into the session monitoring table, and it is determined whether the quantity of session identities of the client is greater than a first preset value; and if the quantity of session identities of the client is greater than the first preset value, the TCP connection is disconnected. In this way, an SSL DoS attack behavior can be effectively defended against.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. Further, the presented or discussed mutual connections may be established by using some interfaces and may be in a form of electricity, machinery, or the like.

In addition, functional units in devices of the embodiments of the present invention may be integrated into one processing unit, or each of the units may exist alone physically, or two or more units may also be integrated into one unit. Moreover, the foregoing units may be implemented in a form of hardware, or may be implemented in a form of hardware in addition to a software functional unit.

All or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a universal serial bus (USB) flash drive, a removable hard disk, a read-only memory (ROM), a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An attack defense method, comprising:
   receiving a key negotiation request message from the client after a Transmission Control Protocol (TCP) connection to a client is established, wherein the key negotiation request message comprises a source internet protocol (IP) address, a user name that is a machine name associated with the client and used to distinguish an independent access source, and a session identity of the client;
   determining, according to the source IP address and the user name of the client, whether a session monitoring table of the client exists, wherein the session monitoring table is used to record the source IP address, the user name, and the session identity of the client that has performed key negotiation;
   determining whether the session identity exists in the session monitoring table of the client when the session monitoring table of the client exists;
   recording the session identity into the session monitoring table when the session identity does not exist in the session monitoring table;
   determining whether a quantity of the session identities of the client in the session monitoring table is greater than a first preset value; and
   disconnecting the TCP connection when the quantity of the session identities of the client in the session monitoring table is greater than the first preset value.

2. The method according to claim 1, wherein the method further comprises:
   acquiring an increment in the quantity of the session identities of the client in the session monitoring table within a unit time;
   determining whether the increment in the quantity of the session identities of the client in the session monitoring table within the unit time is greater than a second preset value; and
   disconnecting the TCP connection when the increment in the quantity of the session identities of the client in the session monitoring table within the unit time is greater than the second preset value.

3. The method according to claim 1, further comprising:
   creating the session monitoring table of the client according to the source IP address, the user name, and the session identity of the client when the session monitoring table of the client does not exist; and
   recording the session identity into the session monitoring table.

4. The method according to claim 2, further comprising:
   creating the session monitoring table of the client according to the source IP address, the user name, and the session identity of the client when the session monitoring table of the client does not exist; and
   recording the session identity into the session monitoring table.

5. The method according to claim 1, further comprising sending a key negotiation response message comprising the session identity to the client when the session identity exists in the session monitoring table.

6. The method according to claim 1, further comprising sending a key negotiation response message comprising the session identity to the client after recording the session identity into the session monitoring table and when the quantity of the session identities of the client in the session monitoring table is not greater than the first preset value.

7. The method according to claim 2, further comprising sending a key negotiation response message comprising the session identity to the client when the session identity exists in the session monitoring table.

8. The method according to claim 2, further comprising sending a key negotiation response message comprising the session identity to the client after recording the session identity into the session monitoring table and when the quantity of the session identities of the client in the session monitoring table is not greater than the first preset value.

9. The method according to claim 3, further comprising sending a key negotiation response message comprising the session identity to the client when the session identity exists in the session monitoring table.

10. The method according to claim 3, further comprising sending a key negotiation response message comprising the session identity to the client after recording the session identity into the session monitoring table and when the quantity of the session identities of the client in the session monitoring table is not greater than the first preset value.

11. The method according to claim 1, further comprising deleting the session identity from the session monitoring table after the disconnecting the TCP connection.

12. The method according to claim 2, further comprising adding the client to a blacklist when the increment in the quantity of session identities of the client within the unit time is greater than the second preset value.

13. An attack defense device, comprising:
a processor; and
a memory having stored therein instructions, when executed by the processor, causes the processor to perform an attack defense method comprising:
  receiving a key negotiation request message sent by the client after a Transmission Control Protocol (TCP) connection to a client is established, wherein the key negotiation request message comprises a source IP address, a user name that is a machine name associated with the client and used to distinguish an independent access source, and a session identity of the client;
  determining, according to the source internet protocol (IP) address and the user name of the client, whether a session monitoring table of the client exists, wherein the session monitoring table is used to record the source IP address, the user name, and the session identity of the client that has performed key negotiation,
  determining whether the session identity exists in the session monitoring table of the client when the session monitoring table of the client exists,
  recording the session identity into the session monitoring table when the session identity is determined not exist in the session monitoring table,
  determining whether a quantity of session identities of the client in the session monitoring table is greater than a first preset value; and
  disconnecting the TCP connection when the quantity of session identities of the client in the session monitoring table is determined to be greater than the first preset value.

14. The attack defense device according to claim 13, wherein the processor performing an attack defense method further comprises:

acquiring an increment in the quantity of the session identities of the client in the session monitoring table within a unit time,
  determining whether the increment in the quantity of session identities of the client in the session monitoring table within the unit time is greater than a second preset value,
  disconnecting the TCP connection when the increment in the quantity of the session identities of the client in the session monitoring table within the unit time is greater than the second preset value.

15. The attack defense device according to claim 13, wherein the processor performing an attack defense method further comprises:
  creating the session monitoring table of the client according to the source IP address, the user name, and the session identities of the client when the session monitoring table of the client is determined to not exist, and
  recording the session identity into the session monitoring table when the session monitoring table of the client is determined to not exist.

16. The attack defense device according to claim 14, wherein the processor performing an attack defense method further comprises:
  creating the session monitoring table of the client according to the source IP address, the user name, and the session identity of the client, and
  recording the session identity into the session monitoring table the session monitoring table of the client is determined to not exist.

17. The attack defense device according to claim 13, wherein the processor performing an attack defense method further comprises:
  sending a key negotiation response message comprising the session identity to the client when the session identity is determined to exist in the session monitoring table.

18. The attack defense device according to claim 13, wherein the processor performing an attack defense method further comprises:
  sending a key negotiation response message comprising the session identity key to the client after the session identity is recorded into the session monitoring table and the quantity of the session identities of the client in the session monitoring table is determined not to be greater than the first preset value.

19. The attack defense device according to claim 14, wherein the processor performing an attack defense method further comprises:
  deleting the session identity from the session monitoring table after the TCP connection is disconnected, and
  adding the client to a blacklist when the increment in the quantity of the session identities of the client in the session monitoring table within the unit time is greater than the second preset value.

* * * * *